United States Patent [19]

Parker et al.

[11] Patent Number: 4,650,679

[45] Date of Patent: Mar. 17, 1987

[54] ANIMAL FEED BLOCK COMPOSITIONS

[75] Inventors: Lawrence D. Parker, Stubbington; Adrian M. English, Gosport, both of England

[73] Assignee: American Cyanamid Company, Stamford, Conn.

[21] Appl. No.: 691,237

[22] Filed: Jan. 14, 1985

[51] Int. Cl.[4] .................. A61K 35/74; A23K 1/18
[52] U.S. Cl. ...................... 424/118; 424/117; 424/115; 426/2; 426/807
[58] Field of Search ............. 514/2; 424/115, 117, 424/118; 426/2, 807

[56] References Cited

U.S. PATENT DOCUMENTS

| | | | |
|---|---|---|---|
| 3,832,462 | 8/1974 | Shu et al. ........................ | 424/118 |
| 4,089,980 | 5/1978 | Berger et al. ..................... | 426/807 |
| 4,217,370 | 8/1980 | Rawlings et al. ................. | 426/807 |
| 4,221,818 | 9/1980 | Schroeder ........................ | 426/807 |
| 4,491,599 | 1/1985 | Citterio .......................... | 426/807 |

*Primary Examiner*—Donald B. Moyer
*Assistant Examiner*—Jacqueline M. Stone
*Attorney, Agent, or Firm*—Estelle J. Tsevdos

[57] ABSTRACT

The present invention relates to animal feed block compositions containing a growth promoter, such as avoparcin, and an organic or mineral acid. The feed blocks of this invention exhibit improved potency retention of the growth promoter. Further provided are methods for enhancing the growth promoter potency retention of such feed blocks by adjusting the pH of the feed blocks below pH 7 with the organic or mineral acid.

5 Claims, No Drawings

ANIMAL FEED BLOCK COMPOSITIONS

BACKGROUND OF THE INVENTION

The present invention relates to animal feed block compositions (hereinafter referred to as feed blocks) containing a growth promoter, such as avoparcin, and an organic or mineral acid and methods for enhancing the potency retention of the growth promoter in the feed blocks.

The incorporation of avoparcin-like complexes in animal feed blocks for enhancing the growth rate of animals is disclosed in U.S. Pat. No. 3,856,937, issued Dec. 24, 1974. However, when this growth promoter is incorporated into certain commercially-available feed blocks, avoparcin's potency is reduced at a rate of about 20% to 25% per week. The present invention provides methods whereby this reduction in potency is diminished, thereby providing feed blocks with improved growth promoter potency retention.

SUMMARY OF THE INVENTION

The feed blocks of the present invention contain growth-promoting agents, such as avoparcin, as well as other feed block components, such as urea and Ethyl Concentrate (E.C. Feed). E.C. Feed is the residue remaining when ethyl alcohol is distilled from fermented sugar cane molasses. Normally, such feed blocks have a pH of about pH 9–10. Such feed blocks exhibit a loss of avoparcin potency at rates of about 20% to 25% per week.

The present invention provides stable feed blocks containing avoparcin-like growth promoters as well as certain organic or mineral acids. These acids include citric, phosphoric, sulfuric acids and the like or mixtures thereof, in sufficient quantities to adjust the pH of the final feed blocks to less than pH 7, preferably to about pH 3.

Uniquely, it has been found that the incorporation of from 2% to 10%, on a weight basis, of such acids, as described above, during the preparation of the feed composition significantly reduces avoparcin potency losses to about 0% to 5% per week, at a temperature range of about 20° C. to 45° C.

It is an object of the present invention, therefore, to provide animal feed block compositions containing a growth promoter, such as avoparcin, and an organic or mineral acid, having enhanced growth promoter potency retention.

It is a further object of this invention to provide a method for enhancing avoparcin-like growth promoter potency retention of animal feed block compositions by adjusting the pH of such compositions lower than about pH 7 with an organic or mineral acid.

These and further objects of the invention will become more apparent by the following description of the invention.

DESCRIPTION OF THE INVENTION

Animal feed block compositions of the present invention containing growth promoters, such as avoparcin, may be prepared by techniques well known in the art. For instance, such feed blocks can be prepared as described in *Feed Manufacturing Technology*, American Feed Manufacturers Association, Inc. (1976). Then, the feed composition containing about 0.01% to 0.075% animal growth promoter, such as avoparcin, can be compacted with the other feed composition ingredients and the pH adjusted to below pH 7, preferably to about pH 3, with an organic or mineral acid.

The growth promoter may be added either directly to the feed composition or may be added as a premix. Then, the resulting animal feed composition is blended until a uniform mixture is obtained.

Thus, a typical animal feed composition of this invention, containing avoparcin, suitable for compacting into an animal feed block, may be prepared by admixing, on a weight basis, 0.04% avoparcin (0.8% of a 5% avoparcin premix), 15% to 25% Ethyl Concentrate (E.C. Feed), 0% to 3% lignosulphonate binder, 10% to 25% vitamin premix, 35% to 55% of a suitable meal, such as barley meal or maize meal, 8% to 10% molasses, 3% urea, salt and water plus 3% to 10%, on a weight basis, of an organic or mineral acid, such as citric acid, phosphoric acid, sulfuric acid or mixtures thereof to total 100%. Such a feed block thus has a pH below 7, preferably about pH 3.

It should, of course, be recognized that these feed compositions thus prepared need not be made into blocks in order to be fed to animals and that the weight percentages of the ingredients may be adjusted to accommodate the addition, deletion or substitution of the basic feed or growth promoter for a particular diet or for administration to a particular animal.

The present invention is illustrated by the following examples, which are merely illustrative and not limitative thereof.

EXAMPLE 1

The effect of pH and Ethyl Concentrate (E.C. Feed) concentration on the stability of avoparcin in animal feed block compositions Feed blocks weighing 1.1 kg to 1.2 kg and containing 400 ppm (0.04%) of avoparcin are prepared, varying the quantity of E.C. Feed from 15% to 25% and varying the pH by the addition of citric or phosphoric acid. The blocks are prepared by placing the wet mix into a mold and compacting it with a suitable piston. Once formed, a portion is broken off for microbiological analysis of the initial avoparcin concentration and for pH determination. pH determinations are done by preparing a 10%, by weight, slurry in water and measuring the pH of the resulting mixture. The remaining portion of the block is divided in half, and each half is stored in a polyethylene bag, one at 45° C. and the other at 20° C.

Samples are taken after storage for one and two weeks for a 45° C. stability evaluation and at four and 12 weeks for a 20° C. stability evaluation. Each sample is analyzed for avoparcin by microbiological assay, and the pH is again determined as previously described.

The results of these experiments are summarized in Table I.

TABLE I

The Effect of pH and Ethyl Concentrate (E.C.) Concentration on the Stability of Avoparcin in Animal Feed Block Compositions

| Composition | % E.C. Feed | % Citric acid | % Phosphoric acid | pH Initial | pH 2 weeks 45° C. | % of original avoparcin potency 2 weeks 45° C. | % of original avoparcin potency 12 weeks 20° C. |
|---|---|---|---|---|---|---|---|
| A | 25 | 7 | — | 3.9 | 8.9 | 53.3 | 79.1 |
| B | 25 | 10 | — | 3.0 | 8.3 | 64.7 | 90.4 |
| C | 20 | 10 | — | 3.1 | 3.0 | 87.5 | 87.2 |
| D | 15 | 10 | — | 2.9 | 4.1 | 98.8 | 89.0 |
| E | 25 | — | 10 | 3.1 | 4.0 | 86.9 | 98.6 |
| F | 20 | — | 10 | 2.1 | 2.3 | 78.8 | 87.2 |
| Control G | 15 | — | — | 5.5 | 7.4 | 12.2 | 20.3 |

As can be seen by the data in Table I, the feed blocks of the present invention provide improved stability of avoparcin when the pH was adjusted by utilizing an organic or mineral acid.

EXAMPLE 2

The effect of sulfuric acid concentration on the stability of avoparcin in animal feed block compositions containing 20% and 25%, on a weight basis, E.C. Feed Feed blocks containing 0.04% avoparcin were prepared by the procedure of Example 1 and utilizing the ingredients listed in Table II in order to determine the effect of various acid concentrations on the avoparcin potency retention.

The resulting feed blocks were stored in polyethylene bags at 45° C. for two weeks and 20° C. for six weeks and then analyzed by microbiological assay for avoparcin. The results of these tests are summarized in Table III which demonstrate improved stability of avoparcin in animal feed block compositions of the invention containing 3% to 7% sulfuric acid.

TABLE II

| Animal Feed Block Compositions | |
|---|---|
| Component | Weight Percent (%) |
| E.C. Feed | 20–25 |
| Lignosulfonate binder | 0–2.5 |
| Salt | 10 |
| Molasses | 10 |
| Urea | 3 |
| Avoparcin premix (5% avoparcin/CaCO$_3$ | 0.8 (0.04% active ingredient) |
| Water | 3.9–8.0 |
| Barley meal added to | 100 |
| Sulfuric acid, 77% | 0–7 |

TABLE III

The Effect of Sulfuric Acid Concentration on the Stability of Avoparcin in Feed Block Compositions Containing Varying Amounts of E.C. Feed

| E.C. Feed % w/w | H$_2$SO$_4$ (77%) % w/w | % of original avoparcin potency 20° C. 6 weeks | % of original avoparcin potency 45° C. 2 weeks |
|---|---|---|---|
| 25 | 0 | 44.4 | 44.9 |
| 25 | 3 | 67.0 | 47.4 |
| 25 | 5 | 82.0 | 53.3 |
| 25 | 7 | 88.4 | 73.6 |
| 20 | 0 | 71.8 | 47.8 |
| 20 | 3 | 43.9 | 78.2 |
| 20 | 5 | 93.2 | 88.5 |
| 20 | 7 | 93.5 | 82.5 |

What is claimed is:

1. An animal feed composition comprising: avoparcin and citric acid, phosphoric acid, sulfuric acid or mixtures thereof; wherein said feed composition is a feed block and has a pH about pH 7 to pH 3; and wherein the loss in potency of avoparcin is decreased in said animal feed block composition to about 0% to 5% per week.

2. An animal feed block composition according to claim 1, wherein said pH is about pH 3.

3. An animal feed composition comprising: barley meal or maize meal; Ethyl Concentrate; urea; lignosulfonate binder; vitamin premix; avoparcin; citric acid, phosphoric acid, sulfuric acid or mixtures thereof; sodium chloride and water; wherein said animal feed is a feed block and has a pH about pH 7 to pH 3; and wherein the loss in potency of avoparcin is decreased in said animal feed block composition to about 0% to 5% per week.

4. An animal feed block composition according to claim 6 comprising: 35% to 55% meal; 15% to 25% ethyl concentrate; 0% to 3% urea; 0% to 3% lignosulfonate binder; 10% to 25% vitamin premix; 0.01% to 0.07% avoparcin; 2% to 10% citric acid, phosphoric acid, sulfuric acid or mixtures thereof; sodium chloride; and water to total 100%.

5. A method for reducing the loss in potency of avoparcin in an animal feed block composition to about 0% to 5% per week, said method comprising: adding 3% to 10% of citric acid, phosphoric acid, sulfuric acid or mixtures thereof to reduce and maintain the pH of said animal feed block at about pH 7 to pH 3.

* * * * *